(12) United States Patent
Nakagawa et al.

(10) Patent No.: US 10,317,860 B2
(45) Date of Patent: Jun. 11, 2019

(54) MONITORING CONTROL DEVICE

(71) Applicant: Mitsubishi Electric Corporation, Tokyo (JP)

(72) Inventors: Koichi Nakagawa, Tokyo (JP); Noriyasu Fukatsu, Tokyo (JP); Hiroshi Ashiya, Tokyo (JP); Yasuhiro Niwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 575 days.

(21) Appl. No.: 14/787,803

(22) PCT Filed: May 20, 2013

(86) PCT No.: PCT/JP2013/063958
§ 371 (c)(1),
(2) Date: Oct. 29, 2015

(87) PCT Pub. No.: WO2014/188492
PCT Pub. Date: Nov. 27, 2014

(65) Prior Publication Data
US 2016/0070246 A1 Mar. 10, 2016

(51) Int. Cl.
*H04L 29/08* (2006.01)
*H04L 12/24* (2006.01)
(Continued)

(52) U.S. Cl.
CPC ......... *G05B 15/02* (2013.01); *G06F 9/44526* (2013.01)

(58) Field of Classification Search
CPC .... G06F 3/04883; G06F 3/017; G06F 1/1626; G06F 2200/1637; G06F 3/0416;
(Continued)

(56) References Cited

U.S. PATENT DOCUMENTS

| 6,349,408 B1 | 2/2002 | Smith |
| 7,232,267 B2 | 6/2007 | Uchida |

(Continued)

FOREIGN PATENT DOCUMENTS

| CN | 1632761 A | 6/2005 |
| CN | 1968154 A | 5/2007 |

(Continued)

OTHER PUBLICATIONS

Pan et al., GeeAir: a universal multimodal remote control device for home appliances, 13 pages (Year: 2010).*

(Continued)

*Primary Examiner* — Thuy Dao
(74) *Attorney, Agent, or Firm* — Sughrue Mion, PLLC; Richard C. Turner

(57) ABSTRACT

A monitoring control device includes a plug-in management unit that dynamically loads a plug-in made up of a plurality of actions, and that calls a predefined common function, declared in a program of the plug-in, in order to control the execution of an action stored in the plug-in, and extend a function of the monitoring control system, and an action-parameter management unit that holds arrays, in each of which an action parameter is stored, that is a parameter needed for an individual action included in the plug-in, by the number of actions described in a job file, and that designates an identifier and an element index of the arrays in order to read or write a value of the action parameter.

5 Claims, 17 Drawing Sheets

(51) Int. Cl.
*G05B 15/02* (2006.01)
*G05B 19/042* (2006.01)
*G06F 9/445* (2018.01)

(58) Field of Classification Search
CPC ..... G06F 3/0488; G06F 3/044; G06T 15/005; B25J 11/008; B25J 19/0091; B25J 19/023; B25J 19/06; Y10S 901/01
See application file for complete search history.

(56) References Cited

U.S. PATENT DOCUMENTS

| | | | |
|---|---|---|---|
| 7,880,609 B2* | 2/2011 | Viegers | G06Q 10/06 340/539.22 |
| 8,155,769 B2* | 4/2012 | Chandhoke | G05B 19/0426 700/2 |
| 8,959,362 B2* | 2/2015 | Pettigrew | G06F 21/52 713/187 |
| 8,984,529 B2 | 3/2015 | Gibson | |
| 9,119,236 B1* | 8/2015 | Martin | G05B 15/02 |
| 9,244,446 B2* | 1/2016 | Bhageria | G05B 15/02 |
| 10,019,128 B2* | 7/2018 | Goodwin | G06F 9/45558 |
| 2006/0206663 A1* | 9/2006 | Kuwata | G06F 12/0866 711/114 |
| 2008/0001923 A1* | 1/2008 | Hall | G06F 3/0418 345/173 |
| 2008/0162826 A1* | 7/2008 | Okamoto | G06F 11/1076 711/152 |
| 2012/0092277 A1* | 4/2012 | Momchilov | G06F 3/038 345/173 |
| 2012/0226786 A1 | 9/2012 | Nekkar et al. | |

FOREIGN PATENT DOCUMENTS

| | | |
|---|---|---|
| CN | 101110951 A | 1/2008 |
| CN | 102646056 A | 8/2012 |
| CN | 102722409 A | 10/2012 |
| JP | 09-134309 A | 5/1997 |
| JP | 2000-029713 A | 1/2000 |
| JP | 2001-005652 A | 1/2001 |
| JP | 2003-330756 A | 11/2003 |
| JP | 2008-225906 A | 9/2008 |
| JP | 4371693 B2 | 11/2009 |
| JP | 2011-070528 A | 4/2011 |
| JP | 4757873 B2 | 8/2011 |
| JP | 2011-227595 A | 11/2011 |

OTHER PUBLICATIONS

International Search Report of PCT/JP2013/063958 dated Aug. 20, 2013.
Communication dated Dec. 10, 2015 from the German Patent Office issued in corresponding Application No. 11 2013 007 000.6.
Wonderware, S7SIMATIC DAServer User's Guide, Version 1.1.100. Last Revision Aug. 11, 2004, 18 pages total.
Communication dated Jul. 1, 2016 from the State Intellectual Property Office of the P.R.C., in counterpart Chinese application No. 201380076726.7.
Communication dated Dec. 20, 2016, from the State Intellectual Property Office of People's Republic of China in corresponding Application No. 201380076726.7.

\* cited by examiner

FIG.3

ACTION: TB1.FLD1 = (D1000 + D2000) ÷ 2

| ELEMENT NUMBER | | 001 | 002 | 003 | |
|---|---|---|---|---|---|
| ATTRIBUTE | | | | | |
| | COMMON ITEM | | | | |
| | VARIABLE TYPE | DEVICE | DEVICE | DATABASE | |
| | NAME | "D1000" | "D2000" | "TB1.FLD1" | |
| | DATA TYPE | WORD | WORD | DWORD | |
| | INDIVIDUAL ITEM | | | | |
| | DEVICE TYPE | "D" | "D" | - | |
| | OFFSET | 1000 | 2000 | - | |
| | DATABASE NAME | - | - | Test | |
| | TABLE NAME | - | - | Table1 | |
| | FIELD NAME | - | - | Field1 | |
| PRESENT VALUE | | - | - | - | |

| ELEMENT NUMBER | | 001 | 002 | 003 | |
|---|---|---|---|---|---|
| ATTRIBUTE | | | | | |
| | COMMON ITEM | | | | |
| | VARIABLE TYPE | DEVICE | DEVICE | DATABASE | |
| | NAME | "D1000" | "D2000" | "TB1.FLD1" | |
| | DATA TYPE | WORD | WORD | DWORD | |
| | INDIVIDUAL ITEM | | | | |
| | DEVICE TYPE | "D" | "D" | - | |
| | OFFSET | 1000 | 2000 | - | |
| | DATABASE NAME | - | - | Test | |
| | TABLE NAME | - | - | Table1 | |
| | FIELD NAME | - | - | Field1 | |
| PRESENT VALUE | | 0x1000 | 0xE000 | - | |

| ELEMENT NUMBER | | 001 | 002 | 003 | |
|---|---|---|---|---|---|
| ATTRIBUTE | | | | | |
| | COMMON ITEM | | | | |
| | VARIABLE TYPE | DEVICE | DEVICE | DATABASE | |
| | NAME | "D1000" | "D2000" | "TB1.FLD1" | |
| | DATA TYPE | WORD | WORD | DWORD | |
| | INDIVIDUAL ITEM | | | | |
| | DEVICE TYPE | "D" | "D" | - | |
| | OFFSET | 1000 | 2000 | - | |
| | DATABASE NAME | - | - | Test | |
| | TABLE NAME | - | - | Table1 | |
| | FIELD NAME | - | - | Field1 | |
| PRESENT VALUE | | 0x1000 | 0xE000 | 0x00007800 | |

135a

135a33

```
001:<Trigger>
002:    <Condition>D1000 > 100</Condition>
003:    <Invoke jobid="001"/>
004:</Trigger>
005:<Job id="001">
006:    <Actions>
007:        <Action id="42">
008:            <Parameters name="D1000"/>
009:            <Parameters name="D2000"/>
010:            <Parameters name="+"/>
011:            <Parameters name="TB1.FLD1"/>
012:        </Action>
013:        <Action id="01">
014:            -
015:        </Action>
016:        -
017:    <Actions>
018:</Job>
```

```
101:int
102:doExecute( HANDLE parameter)
103:{
104:     int arg1,arg2,result;
105:     unsigned char op;
106:
107:     arg1 = GetIntegerValue( parameter, 0);
108:     arg2 = GetIntegerValue( parameter, 1);
109:     op = GetStringValue( parameter, 2);
110:     switch( op ){
111:        case '+'     result =arg1+arg2;     break;
112:        case '-'     result =arg1-arg2;     break;
113:        case '*'     result =arg1*arg2;     break;
114:        case '/'
115:           if( arg2 == 0 ) return -1;
116:              result =arg1/arg2;
117:              break;
118:         default:
119:     }
120:     SetIntegerValue( parameter,3,result );
121:     return 0;
122:}
123:int
124:QueryActionID(void)
125:{
126:     return 42;
127:}
```

```
200:<Tag name="D1000" type="Device" dataType="WORD">
201:   <No>001</No>
202:   <Address>1000</Address>
203:   <DeviceType>Data</DeviceType>
204:</Tag>
205:<Tag name="D2000" type="Device" dataType="WORD">
206:   <No>002</No>
207:   <Address>2000</Address>
208:   <DeviceType>Data</DeviceType>
209:</Tag>
210:<Tag name="TB1" type="Database" dataType="DWORD">
211:   <Database name="TEST" ipaddr="192.168.10.1"/>
212:   <Table name="Table1">
213:        <Field name="Field1"/>
214:   </Table>
215:</Tag>
```

134a

MONITORING CONTROL DEVICE

CROSS REFERENCE TO RELATED APPLICATIONS

This is a National Stage of International Application No. PCT/JP2013/063958 filed May 20, 2013, the contents of which are incorporated herein by reference in its entirety.

FIELD

The present invention relates to a monitoring control device.

BACKGROUND

In recent years, plug-in programs are in practical use, in which software that is on the Internet is downloaded to a PC (Personal Computer) and used in application programs. These plug-in programs include Adobe Flash Player and Oracle Java® Plug-In, and those plug-in programs are dynamically installed in an application program referred to as a "browser". Commonly known browsers are Microsoft Internet Explorer, Mozilla Foundation Firefox, Apple Safari, and Google Chrome. Other application programs include video editing software, for example, Pegasys video-file conversion software TMPGEnc that is plug-in software for video conversion, which is prepared for each video format such as MPEG, AVI, or FLV.

In the present specification, the term "add-on" is defined as a conceptual "function" that lacks a substance showing the workings of an object, and the term "plug-in" is defined as "software" that has a substance having a function incorporated therein. Further, the term "host" means software present on the main unit side, in which a plug-in is installed. In the aforementioned example, the browser is a host, and the Flash Player is a plug-in.

In the incorporated field, software of a multifunction machine can be sometimes dynamically extended via the Internet.

It is described in Patent Literature 1 that a host computer, connected to a printer via a LAN, obtains function information that is present within a search-target range described in a search-target information list within a search-target information-list UI control module, writes the obtained function information to a function-information list, displays a part of the function information written into the function-information list in a display field on a printer-function setting screen, receives an instruction to add, update, or delete a function that corresponds to the displayed function information, and executes addition, update, or deletion of the function according to the received instruction. According to Patent Literature 1, it is suggested that due to this configuration, a function can be added, updated, or deleted using a plug-in module connected to a driver main-body module.

Meanwhile, the plug-in security has become a social issue. Although a function can be dynamically added, a malicious function may possibly be added, which causes a risk in the entire system. Therefore, for the purpose of improving the plug-in security, there is a commonly known method to execute a plug-in in a process space separate from that of a host program.

It is described in Patent Literature 2 that in a computer device, when a plug-in is confirmed to be reliable, an application passes information to the plug-in, so that the plug-in is executed as a separate process from that of a parent application. According to Patent Literature 2, it is suggested that due to this configuration, the plug-in is executed in its own process space, and therefore the plug-in, which behaves improperly, does not damage the parent application.

CITATION LIST

Patent Literatures

Patent Literature 1: Japanese Patent No. 4371693
Patent Literature 2: Japanese Patent No. 4757873

SUMMARY

Technical Problem

In the technique in Patent Literature 1, there is no description as to how to improve the plug-in security.

In the technique in Patent Literature 2, because a plug-in is executed in a process space separate from that of a host, inter-process communication is generated between the host and the plug-in. Therefore, there is a possibility for the execution speed to be lower. Further, because a new process is generated, there is a possibility of the need for an additional memory.

One of the fields, where the security is particularly important, is a monitoring control field such as FA (Factory Automation) and PA (Process Automation). In such a field, a monitoring control is executed using a control device in a facility such as a factory or a plant. A monitoring control device collects data from sensors within a plant, executes a control program (a control algorithm) using a calculation device within the monitoring control device, and transmits a control signal to a drive device or operates a display device. In recent years, some monitoring control devices communicate with an external system such as an MES (Manufacturing Execution System) or an ERP (Enterprise Resource Planning) via a network. There is an increased number of devices that can be connected to a monitoring control device, and also an increased number of communication methods. As a monitoring control device, there are a PLC (Programmable Logic Controller), an NC (Numerical Controller), a programmable display device, and the like.

In a plant, the real-time property and memory-efficiency are required. Therefore, it is difficult that the method as described in Patent Literature 2 is applied for a plant. To solve these problems, there is a method to implement a plug-in in a process space same as that of a host, and to extend a function, in a format such as a dynamic-link library used in the Microsoft OS (Operation System) Windows®, or a UNIX® shared library. It is conceived that, by using this method, the memory consumption is reduced, inter-process communication is made unnecessary, and therefore high-speed processing can be performed.

In these libraries, data to be input to a plug-in is provided from a host as an argument of a function of the plug-in, or is obtained by the plug-in using a function of the host. A calculation result that is output data is also passed as an argument or as a return value of the function, or it can also be passed as an argument at the time when the plug-in calls the function of the host. In that case, when the specifications of a function to be used for passing data, that are the data type and arrangement of arguments, are changed, it is necessary to recompile the plug-in. As a result, it is difficult to execute the plug-in at a high speed.

In these libraries, a plug-in function or a host function is directly called to pass data that is present in the same process space. Therefore, there is a possibility for execution of a parent process to be interfered with by an unauthorized memory operation or an unauthorized plug-in. That is, because security problems are more likely to occur, it is difficult to execute the plug-in safely.

The present invention has been achieved to solve the above problems, and an object of the present invention is to provide a monitoring control device that can execute a plug-in safely at a high speed.

Solution to Problem

In order to solve the afore-mentioned problems, a monitoring control device that monitors and controls a device according to a host according to one aspect of the of the present invention is so constructed as to include: a plug-in management unit that identifies a target action to be executed among a plurality of actions included in a plug-in attached to the host; and an action-parameter management unit that generates a plurality of arrays, in which a plurality of action parameters corresponding to the actions included in the plug-in are stored, arranges the generated arrays in a process space shared between the host and the plug-in, and that accesses an array corresponding to an action identified by the plug-in management unit among the generated arrays to operate an action parameter corresponding to the designated action.

Advantageous Effects of Invention

According to the present invention, a plug-in and a host can access an identical process space (a shared process space), and an area (a plurality of arrays) dedicated to storing parameters while distinguishing the parameters from each other can be provided between the plug-in and the host. Therefore, the plug-in can be executed without recompiling the host, and also the plug-in can be prevented from directly accessing the host. As a result, the plug-in that extends a function of the host can be safely executed at a high speed, while continuing the execution of the host.

BRIEF DESCRIPTION OF DRAWINGS

FIG. 3 is a diagram illustrating an example of storing an action parameter according to the first embodiment.

FIG. 4 is a diagram illustrating an example of storing present values in the action parameter according to the first embodiment.

FIG. 5 is a diagram illustrating an example of storing a calculation result in the action parameter according to the first embodiment.

FIG. 7 is a diagram illustrating an example of an action according to the first embodiment.

FIG. 12 is a diagram illustrating an example of a variable definition file according to the second embodiment.

DESCRIPTION OF EMBODIMENTS

Exemplary embodiments of a monitoring control device according to the present invention will be explained below in detail with reference to the accompanying drawings. The present invention is not limited to the embodiments.

First Embodiment

Figure 1:
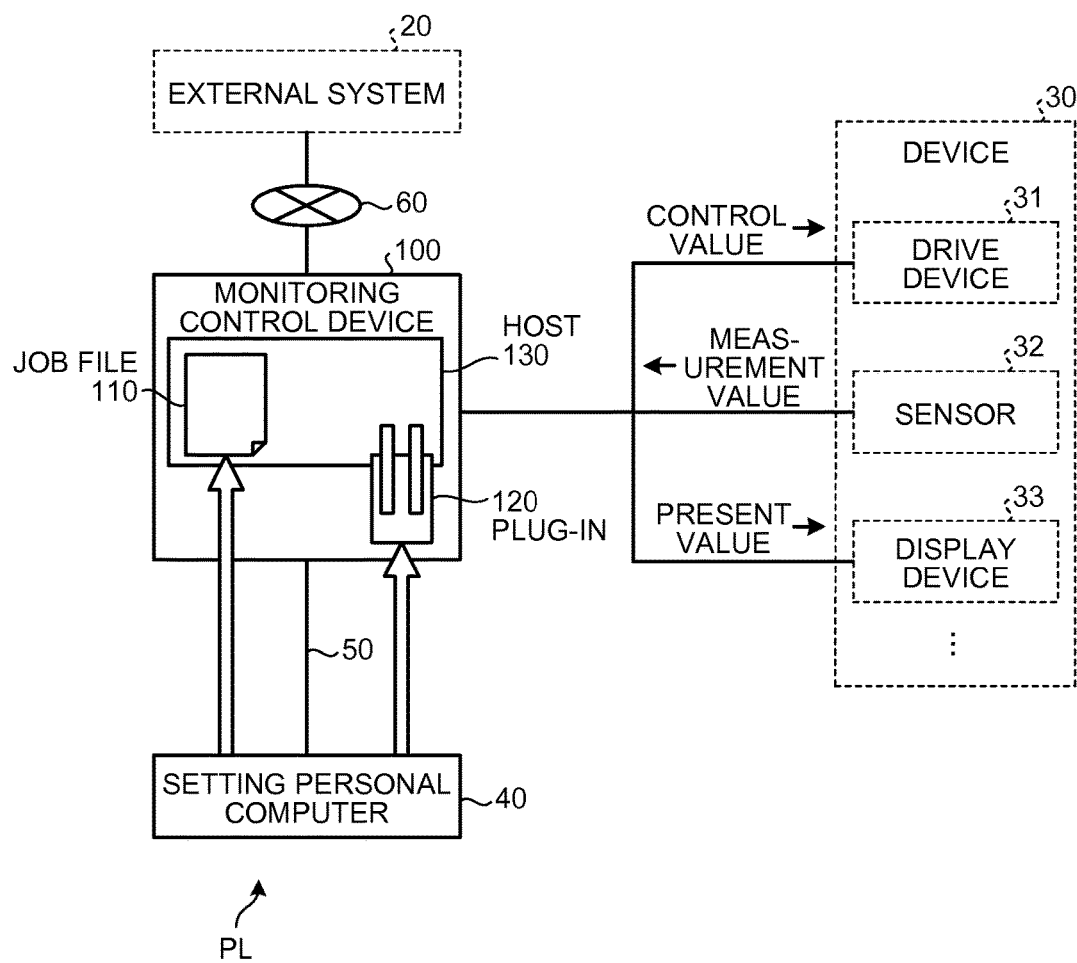
FIG. 1 is a diagram illustrating a configuration of a plant to which a monitoring control device according to a first embodiment is applied.

A monitoring control device 100 according to a first embodiment is described with reference to FIG. 1. FIG. 1 is a block diagram illustrating a configuration example of a plant PL to which the monitoring control device 100 according to the first embodiment is applied.

In the plant (such as a factory) PL, the monitoring control device 100 monitors process data (a measurement value) of a device 30 in the plant PL according to a programmable host 130, and calculates the process data according to a control program (a control algorithm) included in the host 130 to generate and transmit control data (a calculation value) to an external system 20 via a network 60. Examples of the monitoring control device 100 include a PLC (Programmable Logic Controller), an NC (Numerical Controller), and a programmable display device.

As described later, the monitoring control device 100 is an incorporated monitoring control device that is capable of extending a function of the host 130, while executing the host 130. The monitoring control device 100 executes the host 130 to acquire therein a monitoring control system (a configuration including a plurality of functional blocks) 100a. Therefore, for distinguishing from the monitoring control system 100a within the monitoring control device 100, a system external to the monitoring control device 100 is referred to as "external system 20". Examples of the external system 20 include an information processing device such as a server or a personal computer connected to the monitoring control device 100 via the network 60.

The monitoring control device 100 obtains a measurement value of a process value of the plant PL measured by a sensor 32 included in the device 30, and stores the measurement value in an internal memory (a device memory 150) of the monitoring control device 100. Based on this measurement value, the monitoring control device 100 calculates and outputs a control value (a calculation value) to a drive device 31 according to a control program implemented by using a control algorithm such as PID (Proportional Integral Derivative) included in the host 130. Also, the monitoring control device 100 processes a measurement value obtained from the sensor 32, and outputs the processed measurement value as a present value to a display device 33 such as a lamp or a meter.

The monitoring control device 100 is connected to a setting personal computer 40 via a general-purpose cable 50 in compliance with standards such as Ethernet®/USB/RS232C, and can connect to and cooperate with the external system 20 such as a database or an MES/ERP via the network 60 such as the Internet/Intranet. For the sake of simplicity, FIG. 1 illustrates a single device 30. However, the monitoring control device 100 can monitor and control a plurality of devices 30.

The setting personal computer 40 can forward a job file 110 describing a procedure for cooperating with the external system 20 (a logic for cooperating with the external system 20), and can forward a plug-in 120 that extends the function of the host 130, to the monitoring control device 100. Examples of the setting personal computer 40 include an information processing terminal such as a personal computer. Further, under conditions that are set by the setting personal computer 40, the monitoring control device 100 processes a value in the device memory 150 that is a memory within the monitoring control device 100, and transmits the processed value to the external system 20, or processes data obtained from the external system 20, and writes the processed data to the device memory 150 in the monitoring control device 100.

The plug-in 120 extends the host 130 that is a program for implementing the main function of the monitoring control device 100. It is possible to add the plug-in 120 to the host 130, while continuing the execution of the host 130. Therefore, in a case where a cooperative method is changed, such as when a new external system 20 is added, or when a new communication protocol is added, such as a TCP/IP or a SOAP (Simple Object Access Protocol), the plug-in 120 can be downloaded from the setting personal computer 40 to the monitoring control device 100 to cope with the change. In response to this, the monitoring control device 100 can extend the function of the host 130 corresponding to the above change, while continuing a monitoring control operation according to the execution of the host 130.

Figure 2:
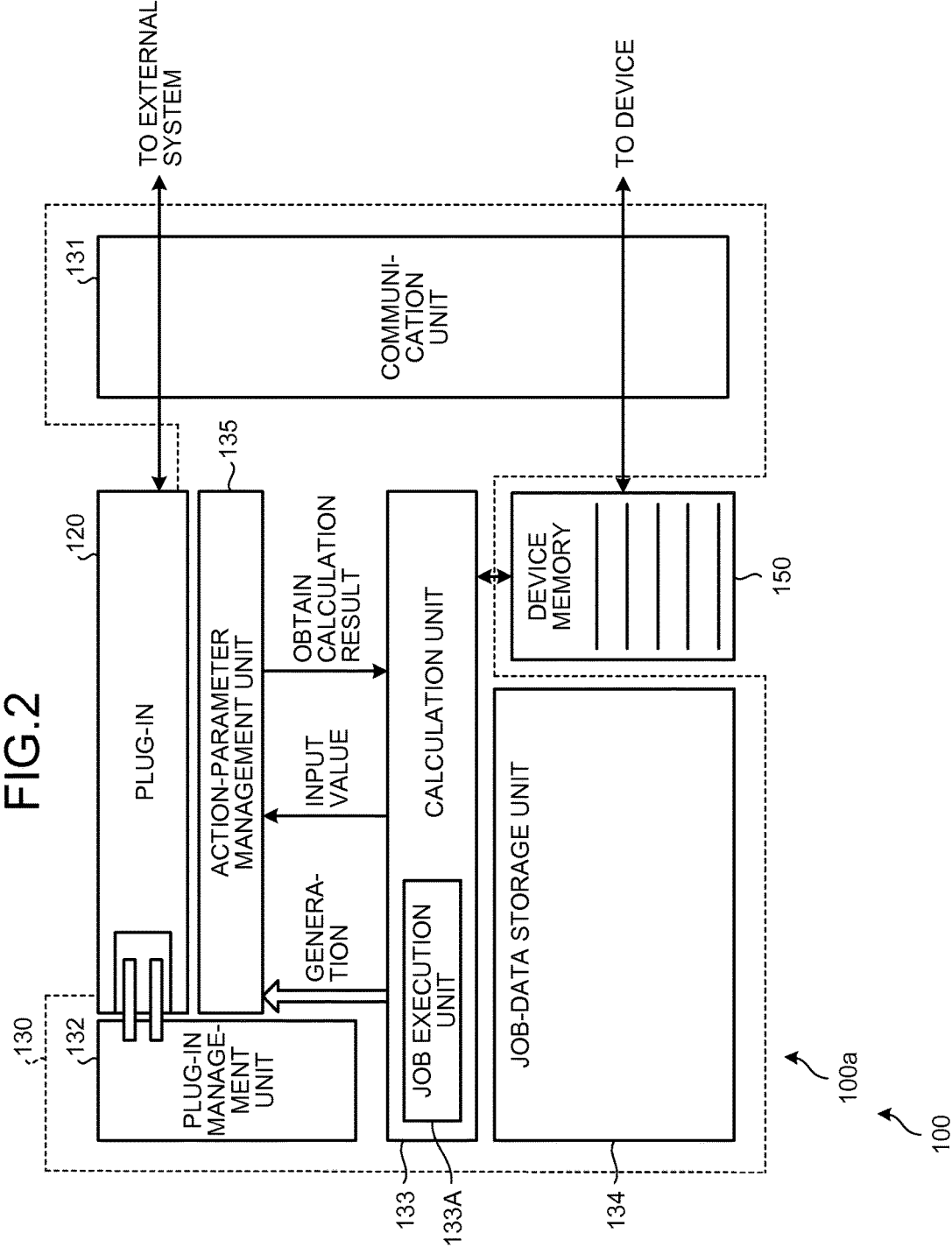
FIG. 2 is a diagram illustrating a functional configuration of the monitoring control device according to the first embodiment.

FIG. 2 illustrates a functional configuration within the monitoring control device 100 (a configuration of the monitoring control system 100a). Those functional configurations illustrated in FIG. 2 can be all generated simultaneously within the monitoring control device 100 according to the execution of the host 130 (for example, at the time of compiling), or can be generated/eliminated one by one according to the stage of the execution of the host 130. In FIG. 2, the dotted-line section illustrates the host 130. The plug-in 120 is functionally attached to the host 130. The host 130 accesses the device memory 150 to write a value to the device memory 150, or read a value from the device memory 150.

In the host 130, a calculation unit 133 monitors whether a trigger is established, where the trigger is a starting condition within the job file 110 (see FIG. 6) downloaded from the setting personal computer 40 (see FIG. 1) via a communication unit 131. The job file 110 includes information for designating the plug-in 120 to be executed in the monitoring control device 100. When the calculation unit 133 determines that the trigger is established, it causes a job execution unit 133A to execute cooperative processing (a job) within the job file 110. The job file 110 downloaded via the communication unit 131 is stored in a job-data storage unit 134 by the communication unit 131. The cooperative processing is described using an action 120a (see FIG. 7). The action 120a is a function to be implemented in the plug-in 120, and is included in the plug-in 120.

That is, the plug-in 120 includes a plurality of actions 120a, and the job file 110 designates the action 120a to be executed among the actions 120a. The calculation unit 133 performs calculation processing according to the designated action 120a, and stores the calculation result in the device memory 150.

The device memory 150 is an internal memory within the monitoring control device 100, and holds therein a measurement value and a calculation value calculated by the action 120a. A plug-in management unit 132 manages registration and deletion of an installed (attached) plug-in 120.

For example, the plug-in management unit 132 refers to a calculation result stored in the device memory 150, and identifies a target action to be executed among the actions 120a included in the plug-in 120 attached to the host 130. For example, the plug-in management unit 132 calls an identifier that designates a target action to be executed, and that is declared in a program of the plug-in 120, in order to control the execution of the action 120a stored in the plug-in 120, and extend a function of the host 130.

The communication unit 131 communicates a calculation value, a measurement value, and a control value with the external system 20 and the device 30. In the action 120a, an identifier of data for cooperating with the external system 20 (for example, a variable name) and calculation details are described (see FIG. 7).

An action-parameter management unit 135 generates a parameter with an element made up of attributes and a present value of data to be passed to the plug-in 120, updates the present value, and writes a value calculated by the action 120a to an action parameter 135a.

For example, the action-parameter management unit 135 generates a plurality of arrays. In the arrays, a plurality of action parameters 135a are stored corresponding to the actions 120a included in the plug-in 120. For example, in each of the arrays, a single action parameter 135a is stored (see FIG. 3).

FIG. 3 illustrates an example in which, as a single action parameter 135a, a plurality of parameters (a plurality of values) are stored, that are necessary to execute an action for a binary operation. This binary operation needs a total of three parameters, two of which are necessary to identify the position to refer to a value to be calculated, and one of which is necessary to identify the location to store a calculation result. FIG. 3 illustrates an array with three parameters as elements with the element numbers "001", "002", and "003". An element 135a4 with the element number "001" is a combination of multiple pieces of information for identifying a memory of the device 30. In the element 135a4, the reference data type, the identifying name, the type of device (for example, a sequencer device), and the offset address are arranged and stored. Therefore, in this element 135a4, a value at the offset address 1000 of a data register "D" in the device (for example, a sequencer device) is read by the WORD (a 2-byte unsigned integer) type.

The relation between rows and columns in FIG. 3 is described. Each of columns with the element numbers "001", "002", and "003" in FIG. 3 (for example, a column 135a4 with the element number "001") shows an element of the array. In contrast thereto, each of rows, such as variable type and name (for example, a "name" row 135a5), represents an attribute of the element. Therefore, for example, "D1000" indicates that the value of the element with the element number "001" in the action parameter 135a has the attribute "name" of "D1000".

In the process space shared between the host 130 and the plug-in 120 (that is, in an address space to which a memory area is allocated), the action-parameter management unit 135 arranges a plurality of generated arrays (for example, allocates a memory address). For example, the action-parameter management unit 135 calls a program of the plug-in 120, that is, a common function declared in the description of the action 120a (see FIG. 7), in order to arrange at least one of a plurality of arrays in the process space shared between the host 130 and the plug-in 120. That is, a common function (for example, "QueryActionID( )" in FIG. 7) corresponds to the process space shared between the host 130 and the plug-in 120.

The action-parameter management unit 135 accesses an array among a plurality of arrays, which corresponds to the action 120a designated by the plug-in management unit 132, and operates an action parameter that corresponds to the designated action 120a. For example, the action-parameter management unit 135 accesses an array among a plurality of arrays, which is designated by an identifier called by the plug-in management unit 132, and designates an element index to the accessed array, thereby to read or write a value included in the action parameter. For example, when an element index is given to an array, the array returns attributes of the device 30 that is a monitoring target (such as an identifier of the device 30 and the type of the device 30), and returns a present value of the device 30 (for example, a value indicating a present operating state or a present controlled state of the device 30) as an element of the array.

There are various types of variables managed by the monitoring control system 100a, each of which has different attributes. The variable type includes a global variable, a local variable, a device variable, and a database variable. The global variable is a variable shared in a single monitoring control system 100a (that is, in the host 130), and has attributes such as station number, network number, variable name, and data type. The local variable is a variable shared within one of programs in the monitoring control system 100a, including a plurality of programs included in the host 130 (for example, a control program and other programs). The local variable has attributes such as program name, variable name, and data type. The device variable is used to refer to a physical memory of the monitoring control device 100, and has attributes such as memory type, address indicating the position, and variable name. The memory type includes a register, a cache, a random access memory, a sequential access memory, and other memories. The database variable is a variable associated with a field of the database, and is considered to have attributes such as table name, field name, variable name, data type, and extraction condition. While these variables differ depending on the system, it is common for these variables to have attributes. FIG. 12 illustrates an example in which these variables are defined in a file. To the variables, their attributes are defined (declared) when the host 130 is programmed, and thus the variable reference range can be controlled.

In a variable definition file 134a illustrated in FIG. 12, two device variables D1000 and D2000, and a database variable TB1.FLD1 are defined. The variable D1000 indicates that the variable type is a device variable, the data type is WORD (2-byte unsigned), the offset address is 1000, and the device type is data. The variable D2000 indicates that the variable type is a device variable, the data type is WORD (2-byte unsigned), the offset address is 2000, and the device type is data. The variable TB1.FLD1 indicates that the variable type is a database variable, the data type is DWORD (4-byte unsigned), the database name is "Test", the IP address needed to connect to the database is 192.168.10.1, the table name is "Table1", and the field name is "Field1". In calculation processing, the variable definition as described above is held inside the monitoring control device 100 (for example, the job-data storage unit 134) by means of reading the variable definition file 134a at the time of initialization, or inputting the variable definition from the setting personal computer 40 to the monitoring control device 100.

The action 120a is intended to operate the variables as described above (variables for monitoring and controlling the device 30). Data needed for this operation is the action parameter 135a. The job file 110 defines which variable the action 120a should proceed (see FIG. 6). For example, the job file 110 designates the action 120a to be executed among the actions 120a included in the plug-in 120 with an identifier (for example, "42" in FIG. 6). The action-parameter management unit 135 manages the actions 120a included in the plug-in 120 by using a common function (for example, "QueryActionID( )" in FIG. 7) for which action parameter 135a the identifier of the action 120a corresponds to. The action-parameter management unit 135 can identify the processing-target action parameter 135a according to a given identifier of the action 120a.

This concept is described with reference to FIG. 3, using the action 120a for averaging two variables as an example. In the job file 110 (see FIG. 6), there are device variables D1000 and D2000, and the average value of the two variables is written to the database variable TBL1.FLD1. Because this action 120a needs three variables D1000, D2000, and TBL1.FLD1, three elements are stored in the action parameter 135a. FIG. 3 illustrates an example of storing the action parameter 135a. The action parameter 135a can be divided into three sections that are an index (element index) 135a1 that indicates the storage position, a variable-attribute (for example, attributes of the device 30) storing section 135a2, and a present-value (for example, a present value of the device 30) storing section 135a3. The attributes are categorized into common attributes to variables (for example, a variable name) and individual attributes (for example, a device type).

That is, the action parameter 135a is implemented as an array that returns, for example, attributes and a present value of a variable when the index 135a1 is given to the action parameter 135a. For example, when the index 135a1 is given to the action parameter 135a in the initial state, the array returns "null" (indicating a blank) or the like as a present value. The action-parameter management unit 135 holds the arrays, in each of which the action parameter 135a is stored, by the number of the actions 120a described in the job file 110. For example, the array, in which the action parameter 135a is stored, includes the index 135a1 illustrated in FIG. 3 as an element index for designating the array element. An identifier of the array, in which the action parameter 135a is stored, is associated with an identifier of the action 120a. Therefore, according to an identifier of a processing-target action 120a, the action-parameter management unit 135 designates an identifier and an element index of the array in order to read or write a value of the action parameter 135a.

FIG. 4 illustrates an example of storing present values 135a31 and 135a32 in the action parameter 135a by using the function of the monitoring control device 100. Normally, an access API (Application Interface) is prepared for obtaining the present values 135a31 and 135a32. Therefore, the present values 135a31 and 135a32 are obtained using the access API (via a process space shared between the host 130 and the plug-in 120 (or via a common function), for example). That is, the monitoring control device 100 converts a measurement value obtained from the sensor 32, and attributes corresponding to the measurement value, to attributes and present values for the action parameter 135a by using the access API (in an associated state with each other), and defines the converted present values as the present values 135a31 and 135a32.

In FIG. 4, based on the converted attributes, "4096 (0x1000)" is obtained from the monitoring control device 100 and stored as the present value 135a31 of the variable "001" (the variable "D0001"). Similarly, as the present value 135a32 of the next variable "002" (the variable "D0002"), "57344 (0xE000)" is obtained and stored. These two values are added and averaged, thereby obtaining "30720 (0x7800)". Therefore, as illustrated in FIG. 5, the variable "003" (the variable "TBL1.FLD1") is different from other variables in that the data type is DWORD (4-byte unsigned). Accordingly, "0x00007800" is stored as a calculation value 135a33.

Figure 6:
FIG. 6 is a diagram illustrating an example of a job file according to the first embodiment.

FIG. 6 is an example of the job file 110 according to the first embodiment. In this example, the job file 110 is described in an XML (eXtended Markup Language) format. However, other data formats can be also used (for example, a markup language such as an SGML (Standard Generalized Markup Language) or an HTML (HyperText Markup Language), and a programming language such as a BASIC or a C language).

In the job file 110 illustrated in FIG. 6, in rows 001 to 004, a trigger that is a condition for invoking a job is declared. In rows 005 to 018, a job to be executed is declared. The row 002 indicates a conditional expression included in the trigger. The row 002 shows "D1000>100", that is, a job is invoked when the variable D1000 is greater than 100. The row 003 indicates an identifier of a job to be invoked. This means invoking a job with the job identifier "001". The row 007 indicates that an identifier of the first action 120a included in the job is "42". The identifier of the action 120a is the number that is set to the action 120a when the plug-in 120 is registered. In this example, "42" represents the action 120a, in which a binary operation (averaging) is performed on the first variable and the second variable according to an operator designated as the third argument, and the calculation result is set to the fourth variable. The rows 008 to 011 indicate parameters to be passed to the action 120a. In these rows 008 to 011, the variables "D1000" and "D2000", the operator "+", and the variable "TBL.FLD1" are designated. In this manner, data to be passed to the action 120a is described in the job file 110.

FIG. 7 is a description example of the action 120a included in the plug-in 120. This example illustrates the action 120a implemented using the C language, in which a binary operation is performed on the first and second data according to an operator designated by the third data in the action parameter 135a. However, the implementation of the action 120a is not particularly limited to that using the C language. It is also possible to implement the action 120a using other programming languages (such as the BASIC).

A row 102 shows the function name to be executed "doExecute" and the argument "HANDLE parameter". The function name is set to be a name determined by the monitoring control system 100a. To the argument, a variable "HANDLE parameter" with a name of HANDLE-type parameter is designated. This variable is an identifier of the action parameter 135a, and one action parameter 135a is generated for each action 120a in which it is used, and has a unique value within the monitoring control system 100a. In rows 104 and 105, variables to be used in the action 120a are declared. In a row 107, the first value (an integer-type value) of the action parameter 135a is stored in a variable "arg1". Similarly, in a row 108, the second value (an integer-type value) of the action parameter 135a is stored in a variable "arg2". In a row 109, the third value (a string-type value) of the action parameter 135a is stored in a variable "op". The variable "op" represents an operator. In rows 110 to 119, the variables "arg1" and "arg2" are calculated according to the type of the operator, and the result of the calculation (an integer-type value) is stored in a variable "result". In a row 120, the variable "result" is stored in the fourth element of the action parameter 135a.

Figure 8:
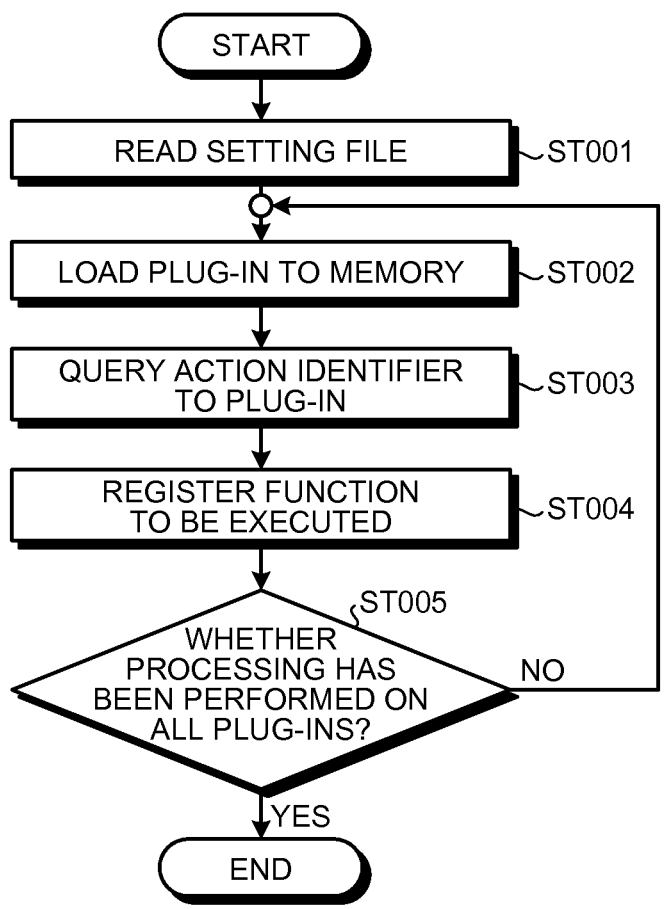
FIG. 8 is a flowchart illustrating a flow of registering an action according to the first embodiment.

Next, an action registration-processing flow in the plug-in management unit 132 is described using a flowchart in FIG. 8.

At Step ST002, the plug-in 120 arranged at a designated location is loaded to a memory. The designated location can be any location in a file system, such as a folder or a directory. A loadable module at this location is read automatically.

However, as illustrated at Step ST001, which module is loaded can be described in a setting file or other files, and the described module can be selected.

At Step ST003, an identifier of the action 120a is queried to the plug-in 120. The identifier can be queried using a specified function. For example, as illustrated in FIG. 7, a common function named "QueryActionID( )" is predefined in a program of the plug-in 120, and an ID that identifies an action in the program, such as "42" in the aforementioned example in FIG. 7, is returned in this function, so that a job in FIG. 6 can be executed.

At Step ST004, the identifier of the action 120a and the address of the plug-in 120 are paired and registered in the plug-in management unit 132 (see FIG. 2). Here, the address of the plug-in 120 is a function pointer or the like to be used for executing the action 120a defined in the plug-in 120. In the example in FIG. 7, "doExecute" is registered together with the identifier "42".

At Step ST005, whether or not the processing at Steps ST002 to ST004 has been performed on all the actions 120a used in a job is determined. If the processing at Steps ST002 to ST004 has not been performed on all the actions 120a (NO at ST005), the processing flow returns to Step ST002. If the processing at Steps ST002 to ST004 has been performed on all the actions 120a (YES at ST005), the processing flow ends.

Figure 9:
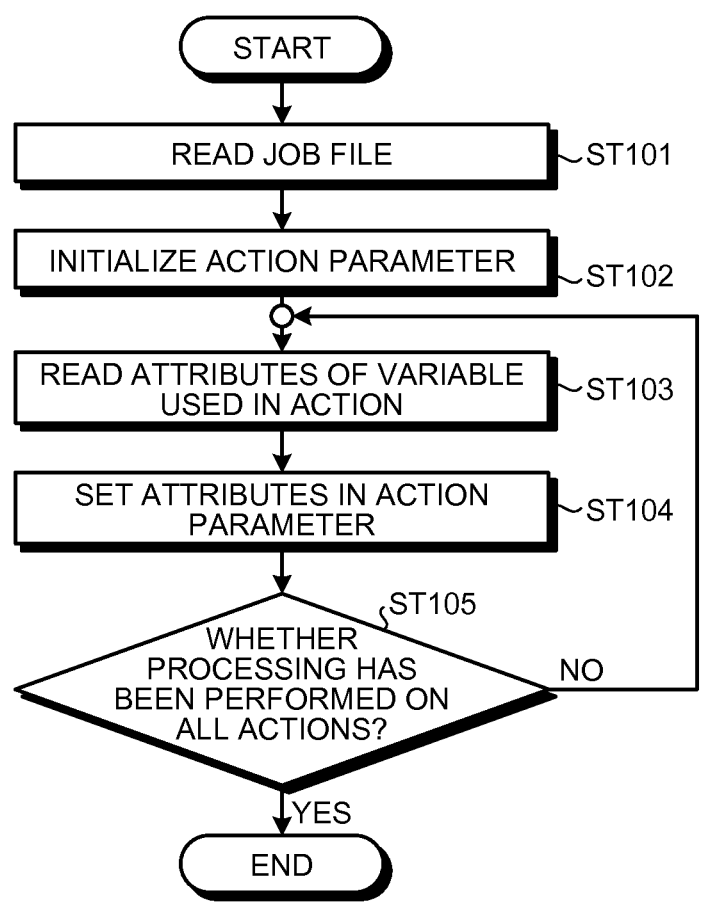
FIG. 9 is a flowchart illustrating a flow of generating the action parameter according to the first embodiment.

Next, a processing flow for generating the action parameter 135a in the first embodiment is described according to a flowchart illustrated in FIG. 9.

At Step ST101, the job file 110 is read out. In this example, the job file 110 in FIG. 6 is read.

At Step ST102, the action parameter 135a is generated and initialized.

At Step ST103, from the job file 110, attributes of variables used in the job, "D1000", "D2000", and "TB1.FLD1" in the example in FIG. 6, are stored in the action parameter.

At Step ST105, whether the processing at Steps ST102 and ST103 has been performed on all the actions 120a used in the job is determined. If the processing at Steps ST102 and ST103 has not been performed on all the actions 120*a* (NO at ST105), the processing flow returns to Step ST103. When the processing at Steps ST102 and ST103 has been performed on all the actions 120*a* (YES at ST105), the processing flow ends.

Figure 10:
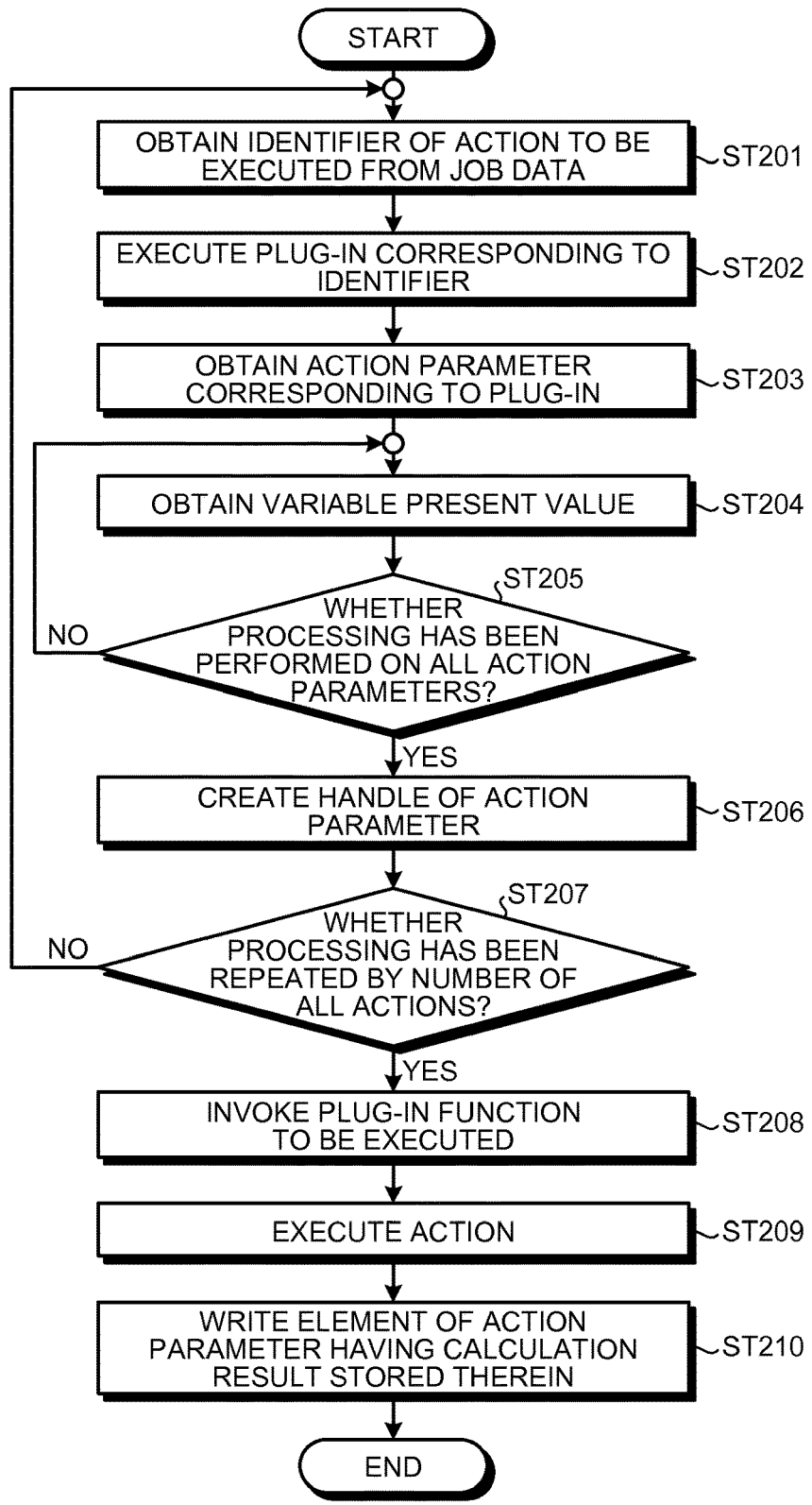
FIG. 10 is a flowchart illustrating a flow of executing the action according to the first embodiment.

Next, a job execution flow in the first embodiment is described according to a flowchart illustrated in FIG. 10. In FIG. 10, an example of executing a job with an identifier "001" in FIG. 6 is described. Further, FIG. 10 illustrates an example of executing the action 120*a* with the identifier "42".

At Step ST201, an identifier of the action 120*a* to be executed is obtained from the job-data storage unit 134. In this example, the identifier "42" is obtained.

At Step ST202, the plug-in 120 corresponding to the obtained identifier of the action 120*a* is obtained from the plug-in management unit 132. That is, the plug-in 120 that corresponds to the identifier of the action 120*a* is executed. In this example, it is assumed that the plug-in 120 including the action 120*a* in FIG. 7 is obtained. Therefore, the function pointer of the action 120*a*, "doExecute", is obtained.

At Step ST203, the action parameter 135*a* that corresponds to the action 120*a* of the plug-in 120 is obtained from the action-parameter management unit 135.

At Step ST204, the calculation unit 133 refers to the attributes of the action parameter 135*a*, obtains a present value of the variable using a function of the host 130 (and the common function), and substitutes the present value in an element of the action parameter 135*a*. The function of the host 130 is achieved by the access API prepared by each model.

At Step ST205, whether or not the processing at Step ST204 has been performed on all the action parameters 135*a* for processing-target actions 120*a* is determined. If the processing at Step ST204 has not been performed on all the action parameters 135*a* (NO at ST205), the processing flow returns to Step ST204. If the processing at Step ST204 has been performed on all the action parameters 135*a* (YES at ST205), the processing flow advances to Step ST206.

At Step ST206, the calculation unit 133 creates a numerical value (a handle) for accessing the action parameter 135*a*.

At Step ST207, whether or not the processing at Steps ST201 to ST206 has been performed on all the actions 120*a* used in a job is determined. If the processing at Steps ST201 to ST206 has not been performed on all the actions 120*a* (NO at ST207), the processing flow returns to Step ST201. If the processing at Steps ST201 to ST206 has been performed on all the actions 120*a* (YES at ST207), the processing flow advances to Step ST208.

At Step ST208, the calculation unit 133 executes the plug-in 120 designated by the handle.

At Step ST209, the plug-in 120 performs calculation.

At Step ST210, the plug-in 120 writes a calculation result to the action parameter 135*a*. The calculation unit 133 then writes the calculation result written into the action parameter 135*a* in the host 130. As a result, the host 130 updates a value of the device memory 150, or transmits the value to the external system 20 via the communication unit 131.

As described above, in the first embodiment, in the monitoring control device 100, the plug-in management unit 132 identifies the target action 120*a* to be executed among a plurality of actions 120*a* included in the plug-in 120 attached to the host 130. The action-parameter management unit 135 generates a plurality of arrays, in which a plurality of action parameters 135 corresponding to the actions 120*a* included in the plug-in 120 are stored, and arranges the generated arrays in a process space shared between the host 130 and the plug-in 120. The action-parameter management unit 135 then accesses an array among the arrays, which corresponds to the action 120*a* identified by the plug-in management unit 132, and operates the action parameter 135*a* that corresponds to the designated action 120*a*. Due to this operation, a plug-in and a host can access the same process space (a shared process space), and an area (a plurality of arrays) dedicated to storing parameters while distinguishing the parameters from each other can be provided between the plug-in and the host. Therefore, the plug-in can be executed without recompiling the host, and also the plug-in can be prevented from directly accessing the host. As a result, the plug-in for extending a function of the host can be safely executed at a high speed, while continuing the execution of the host.

For example, an area dedicated to storing parameters can be provided between the plug-in 120 and the host 130. Therefore, the variables with complicated and different attributes can be centrally managed by using an identifier or the like, and the memory consumption can be reduced. Further, the security can be improved because of not directly referring to a memory.

For example, the plug-in 120 and the host 130 can be loaded to an identical process, and an area dedicated to storing parameters while distinguishing the parameters from each other can be provided between the plug-in 120 and the host 130. Therefore, the plug-in 120 and a parent process (the host 130) can be associated with each other by only using a simple buffer with a pair of an identifier that identifies a variable and a value of the variable (hereinafter may be referred to just as a "variable value"). Due to this configuration, the plug-in 120 is less likely to be affected by a change in specifications of the parent process (the host 130). That is, because an interface needed for an extension program does not depend on the main unit, the cost of creating and maintaining the extension program can be reduced.

For example, the plug-in 120 and the host 130 can be loaded to an identical process, and an area dedicated to storing parameters while distinguishing the parameters from each other can be provided between the plug-in 120 and the host 130. Therefore, the plug-in 120 does not need to directly call a service of the parent process (the host 130). Due to this configuration, the plug-in 120 does not call a function of the parent process (the host 130), and accordingly it is made difficult to perform an unauthorized operation. That is, because the plug-in 120 does not directly access a memory in the main unit, it is difficult to create an extension program which interferes with the execution of a system.

In the first embodiment, in the monitoring control device 100, the communication unit 131 obtains a measurement value from the device 30 and stores the measurement value in the device memory 150, or outputs a calculation value held in the device memory 150 to the device 30, and further communicates the measurement value and the calculation value held in the device memory 150 with the external system 20. The calculation unit 133 performs calculation according to the host 130, and stores a calculation result as a calculation value in the device memory 150. Together with this process, the job execution unit 133A in the calculation unit 133 obtains the job file 110 designating the plug-in 120, refers to a value in the device memory 150 to perform calculation according to a job by using the plug-in 120, and stores the calculation result as a calculation value in the device memory 150. Due to this operation, the monitoring control device 100 can monitor and control the device 30 according to each of the host 130 and the plug-in 120.

Further, in the first embodiment, in the monitoring control device 100, the plug-in management unit 132 calls an identifier, which is declared in a program of the plug-in 120 (that is, a description of the action 120a) and which designates a target action to be executed, thereby to control the execution of the action 120a stored in the plug-in 120, and extend a function of the host 130. The action-parameter management unit 135 accesses an array among a plurality of generated arrays, which is designated by an identifier called by the plug-in management unit 132, and designates an element index with respect to the accessed array, thereby to read or write a value included in the action parameter 135a. Due to this configuration, a plug-in and a host can be configured to access an action parameter in an area (a plurality of arrays) dedicated to storing parameters, which is arranged in the same process space (a shared process space).

Furthermore, in the first embodiment, in the monitoring control device 100, a numerical value (a handle) for accessing the action parameter 135a needed for executing the plug-in 120 is given. Therefore, the reference range can be reduced, and an exclusive control can also be reduced. Accordingly, high-speed high-security plug-in execution can be achieved. Further, the amount of data exchange can be minimized, and thus unnecessary memory can be reduced.

Second Embodiment

Next, a monitoring control device according to a second embodiment is described. In the following descriptions, parts different from the first embodiment are mainly explained.

In the second embodiment, the action parameter 135a is adjusted (optimized, for example) to have a uniform element size, thereby to construct a more memory-efficient higher-performance monitoring control system 100aj as compared to the first embodiment.

Figure 11:
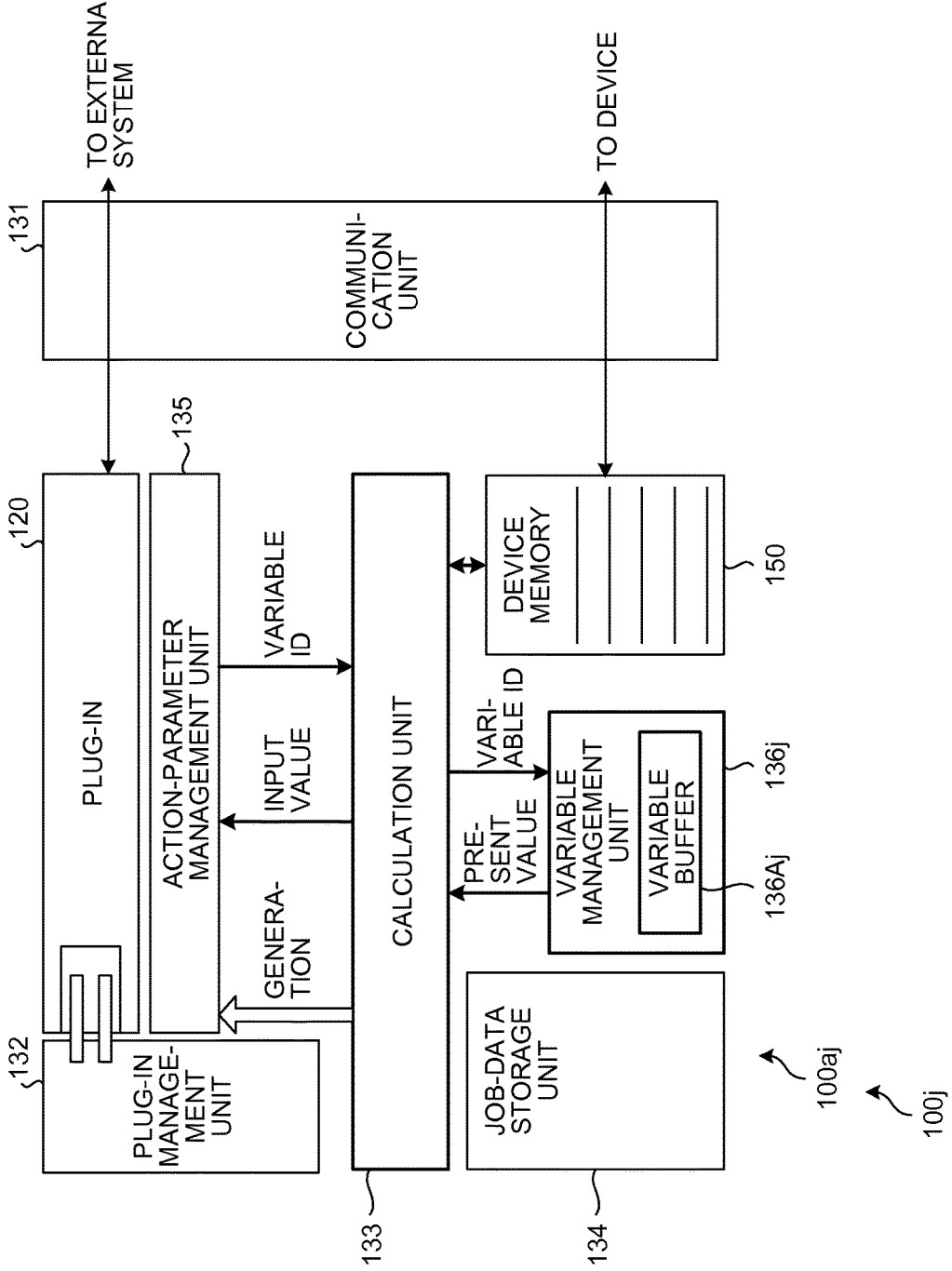
FIG. 11 is a diagram illustrating a functional configuration of a monitoring control device according to a second embodiment.

FIG. 11 is a functional configuration example of a monitoring control device 100j according to the second embodiment (a configuration example of the monitoring control system 100aj). Variables, which can be operated by the plug-in 120, are all managed by a variable management unit 136j, for example. In the variable management unit 136j, a variable is defined according to the content set from the setting personal computer 40 (see FIG. 1). Definable variables can be a global variable, a local variable locally declared within a job, and a database variable mapped to a field of the database, or can also be a fixed value such as a constant and a character string. At this time, an ID referred to as "variable ID" is generated with respect to a plurality of attributes of each variable. The variable management unit 136j can obtain a present value of an applicable variable from the variable ID. When the plug-in 120 is executed, the variable ID is passed from the plug-in 120 to the calculation unit 133. Therefore, the calculation unit 133 obtains a present value via the variable management unit 136j, and passes the present value to the plug-in 120.

The calculation unit 133 creates a variable buffer 136Aj, having attributes of variables to be managed stored therein, according to the variable definition file 134a that is within the job-data storage unit 134 as illustrated in FIG. 12, and that describes job data and variables. The attributes in the variable buffer 136Aj can be accessed by using an identifier that is referred to as "variable ID" as a memory address.

For example, according to job data within the job-data storage unit 134, the calculation unit 133 creates the action parameter 135a in which the variable ID needed for a calculation in the plug-in 120 is stored. The calculation unit 133 obtains attributes of a variable directly from the variable ID stored in the action parameter 135a, and stores a present value of the variable in the action parameter 135a by using a basic function of the host 130 (for example, the access API). That is, the action parameter 135a has a pair of a variable identifier and a present value of the variable (hereinafter may be referred to just as a "variable present value) as an element, and is implemented as an array that returns the variable identifier and the variable present value for example, when given the index 135a1.

Next, the calculation unit 133 requests the plug-in 120 for execution. Upon being requested for execution, the plug-in 120 reads present values from the head of the action parameter 135a one by one to perform calculation, and writes a calculation result back to the action parameter 135a. Upon detection of a fact that the execution of the plug-in 120 is finished, the calculation unit 133 updates the value in the device memory 150, or transmits the value to the external system 20 via the communication unit 131.

As the variable ID, a value can also be used, that is generated by a hash function to which an attribute column is input (a function that returns the hash number when a key such as a character string is given). In this case, attributes are stored in a database, and the hash number in a record, having the attributes stored therein, is used, so that higher-speed access can be performed.

FIG. 12 is an example of configured data that is set in the monitoring control device 100j according to the second embodiment from the setting personal computer 40 (see FIG. 1). FIG. 12 illustrates the configured data regarding two variables. In rows 200 to 204, the first variable is defined. In rows 205 to 209, the second variable is defined. In rows 210 to 215, the third variable is defined. In the row 200, the variable name is defined as "D1000", the variable type is defined as "device memory (Device)", and the data type is defined as "WORD (2-byte unsigned)". Further, in the row 201, the station number of the monitoring control device is defined as "001". In the row 202, the memory offset address is defined as "1000". In the row 203, the device type of the device memory is defined as "Data". Next, in the row 210, the variable name is defined as "TB1.FLD1", the variable type is defined as "database variable (Database)", and the data type is defined as "DWORD (4-byte unsigned)". In the row 211, the database name is defined as "Test", and the operating network address is defined as "192.168.10.1". Further, this variable means that it can have a hierarchical data structure having therein a database table "Table1" to refer to a field "Field1" in the table "Table1".

Figure 13:
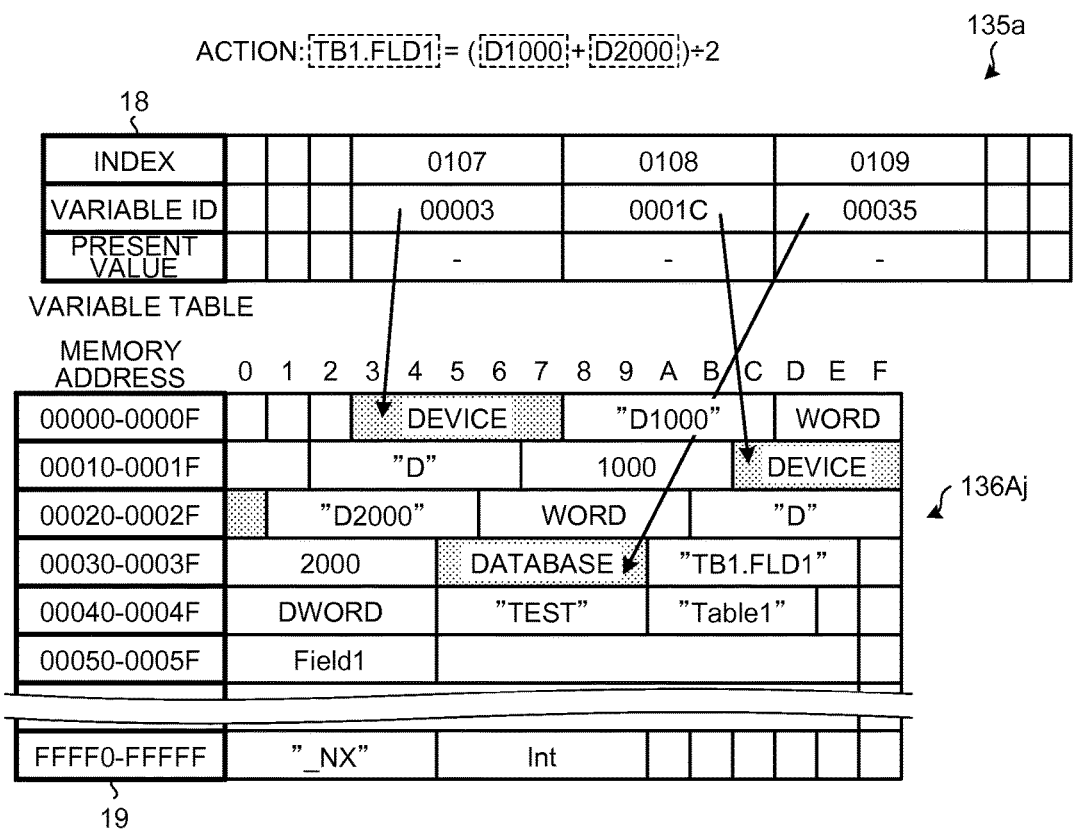
FIG. 13 is a diagram illustrating an example of an action parameter and a variable table according to the second embodiment.
Figure 14:
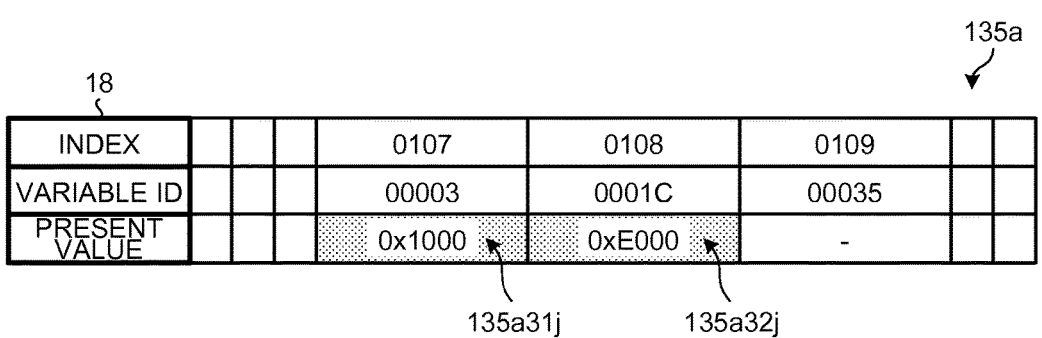
FIG. 14 is a diagram illustrating an example of storing present values in the action parameter according to the second embodiment.
Figures 15, 16:
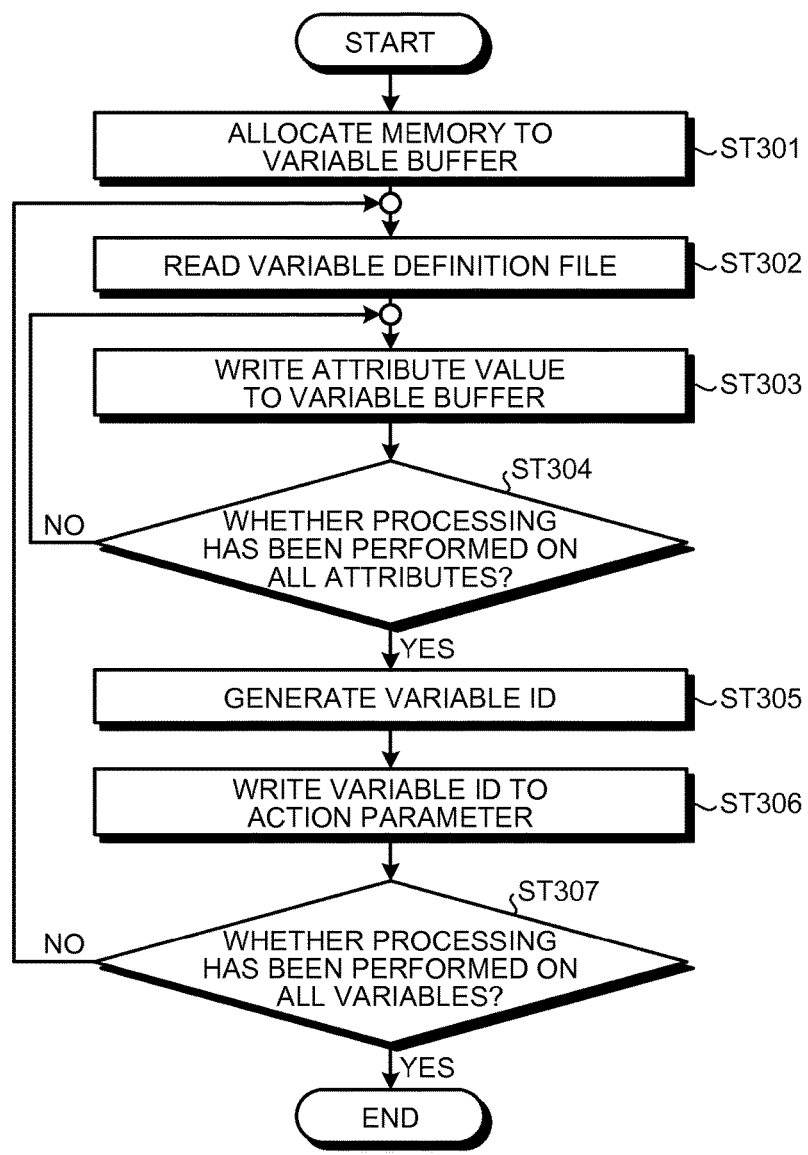
FIG. 15 is a diagram illustrating an example of storing a calculation value in the action parameter according to the second embodiment.
FIG. 16 is a flowchart illustrating a flow of initializing a variable management unit according to the second embodiment.

FIG. 13 illustrates an example of the action parameter 135a and the variable buffer 136Aj in the variable management unit 136j. Variable attributes are successively written to the variable buffer 136Aj. A memory address of a writing location (the variable buffer 136Aj) is written into the action parameter 135a. In FIG. 13, the first variable (a variable with an index "0107") is stored in the address 0003, the second variable (a variable with an index "0108") is stored in the address 0001C, and the third variable (a variable with an index "0109") is stored in the address 0x00035. As illustrated in FIG. 14, present values 135a31j and 135a32j are written into the action parameter 135a. In FIG. 14, "0x1000" is written into the first variable, and "0xE000" is written into the second variable. Lastly, as illustrated in FIG. 15, a calculation result 135*a*33*j* is written in the variable buffer 136A*j*. In this example, "0x00007800" is written.

Next, an initialization operation flow of the variable management unit 136*j* is described using a flowchart in FIG. 16.

At Step ST301, a continuous area for storing variable attributes is reserved for the variable buffer 136A*j*. The capacity of this continuous area is predefined in the monitoring control system 100*aj*.

At Step ST302, the variable definition file 134*a* as illustrated in FIG. 12 is read. At this step, a single variable is read.

At Step ST303, the read attributes (see the variable-attribute storing section 135*a*2 illustrated in FIG. 3) are additionally written into the variable buffer 136A*j* from the head of a designated memory address.

At Step ST304, whether the processing has been performed on all the attributes of a single variable is determined. If the processing has not been performed on all the attributes (NO at ST304), the processing flow returns to Step ST303. If the processing has been performed on all the attributes (YES at ST304), the processing flow advances to Step ST305.

At Step ST305, the variable ID is generated. The variable ID can be any value as long as the variable can be uniquely identified within the monitoring control system 100*aj*. In the example in FIG. 13, the variable ID is a memory address.

At Step ST306, the variable ID is written to the action parameter 135*a* that is using the variable.

At Step ST307, whether the processing at Steps ST302 to ST306 has been performed on all the variables used in a job is determined. If the processing at Steps ST302 to ST306 has not been performed on all the variables (NO at ST307), the processing flow returns to Step ST302. If the processing at Steps ST302 to ST306 has been performed on all the variables (YES at ST307), the processing flow ends.

Figure 17:
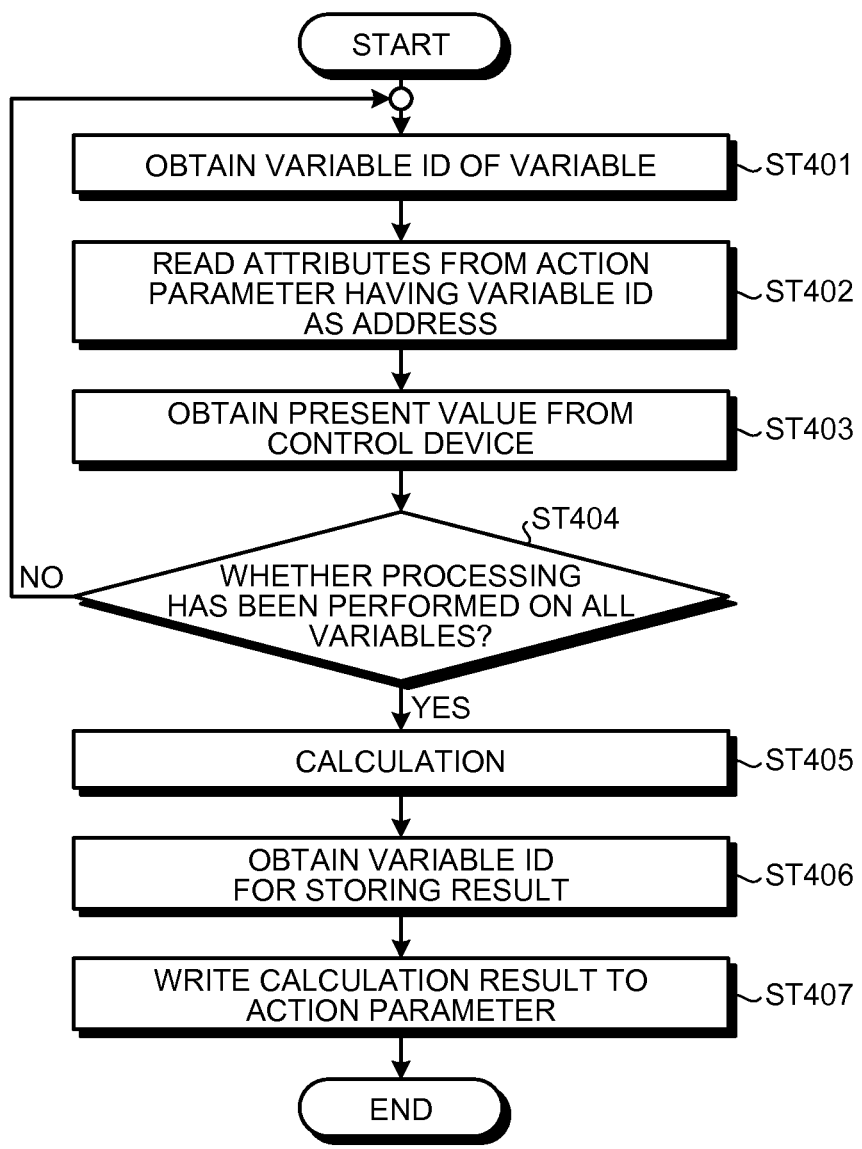
FIG. 17 is a flowchart illustrating a flow of executing a job according to the second embodiment.

Next, a flow of executing the action 120*a* is described using a flowchart in FIG. 17.

At Step ST401, a variable ID is obtained for one of variables included in the action 120*a*.

At Step ST402, variable attributes are obtained from an element of the action parameter 135*a* having the variable ID as an address.

At Step ST403, the obtained attributes are used to obtain a present value from the monitoring control device 100*j*. For example, when the variable is a device variable, the device type "D" (a data register) and the offset 100 are used to read a memory image at the address D100 as WORD-type data.

At Step ST404, whether the processing at Steps ST401 to ST403 has been performed on all the variables included in the action 120*a* is determined. If the processing at Steps ST401 to ST403 has not been performed on all the variables (NO at ST404), the processing flow returns to Step ST401. If the processing at Steps ST401 to ST403 has been performed on all the variables (YES at ST404), the processing flow advances to Step ST405.

At Step ST405, the obtained present value is used to perform calculation.

At Step ST406, a variable ID of a variable for storing a calculation result is obtained.

At Step ST407, the calculation result is written into an element of the action parameter 135*a* having the variable ID as a memory address.

As described above, in the second embodiment, in the monitoring control device 100*j*, the variable management unit 136*j* performs calculation by obtaining and operating a value in a memory (the variable buffer 136A*j*) and data in the external system 20, and transmits a result of the calculation to the external system 20 or writes it in the memory (the variable buffer 136A*j*). At this time, the variable management unit 136*j* defines a value in the memory (the variable buffer 136A*j*) and data in the external system 20, which is a processing target in a program, as a variable, and assigns an identifier (a variable ID) to a set of attributes for identifying the defined variable to manage the variable. The action parameter 135*a* is an array having a pair of a variable identifier (a variable ID) and a variable present value as an element. Before the execution of the action 120*a*, the calculation unit 133 obtains variable attributes from the action parameters 135*a* related to all the actions 120*a* included in a job, and obtains variable present values by using the obtained attributes to store the obtained present values in the action parameters 135*a*. After the completion of execution of all the actions 120*a*, the calculation unit 133 removes calculation results from the action parameters 135*a* to update the present values according to the attributes. Due to this operation, regardless of the variable type, a fixed-length identifier (a variable ID) for parameters needed for executing the action 120*a* is held within the action parameter 135*a*. Therefore, memory needed at the time of executing the action 120*a* can be reduced. Further, the elements in the action parameter 135*a* (the array) can have a uniform size (data length), and therefore a search with a designated element index of the array can be performed at a high speed, and execution performance of the action 120*a* can be improved. That is, because the action parameter 135*a* is adjusted (optimized, for example) to have a uniform element size, a more memory-efficient higher-performance monitoring control system 100*aj* can be constructed as compared to the first embodiment.

Third Embodiment

Next, a monitoring control device according to a third embodiment is described. In the following descriptions, parts different from the first embodiment are mainly explained.

In the third embodiment, an action execution state such as exception handling or timeout is monitored in order to construct a more reliable system as compared to the first embodiment.

In a general operating system (OS) such as Unix® or Microsoft Windows®, there is an inter-process communication method referred to as a "signal". When a signal is transmitted, the OS interrupts a normal processing flow of a target process. If a reception process registers a signal handler in advance, a routine of the signal is executed when the signal is received. The signal is transmitted also when an exception of a program occurs, such as a zero divide or a segmentation fault. Similarly to the signal, if a handler is registered also for a timeout, then the processing is executed with an interruption. In the Windows®, a method using "WaitForSinglObject( )" that is the Win32 API is commonly known. The Unix® uses a method, in which the function "alarm( )" is used to generate a signal SIGALRM and invoke a registered handler by the function "signal( )".

Figure 18:
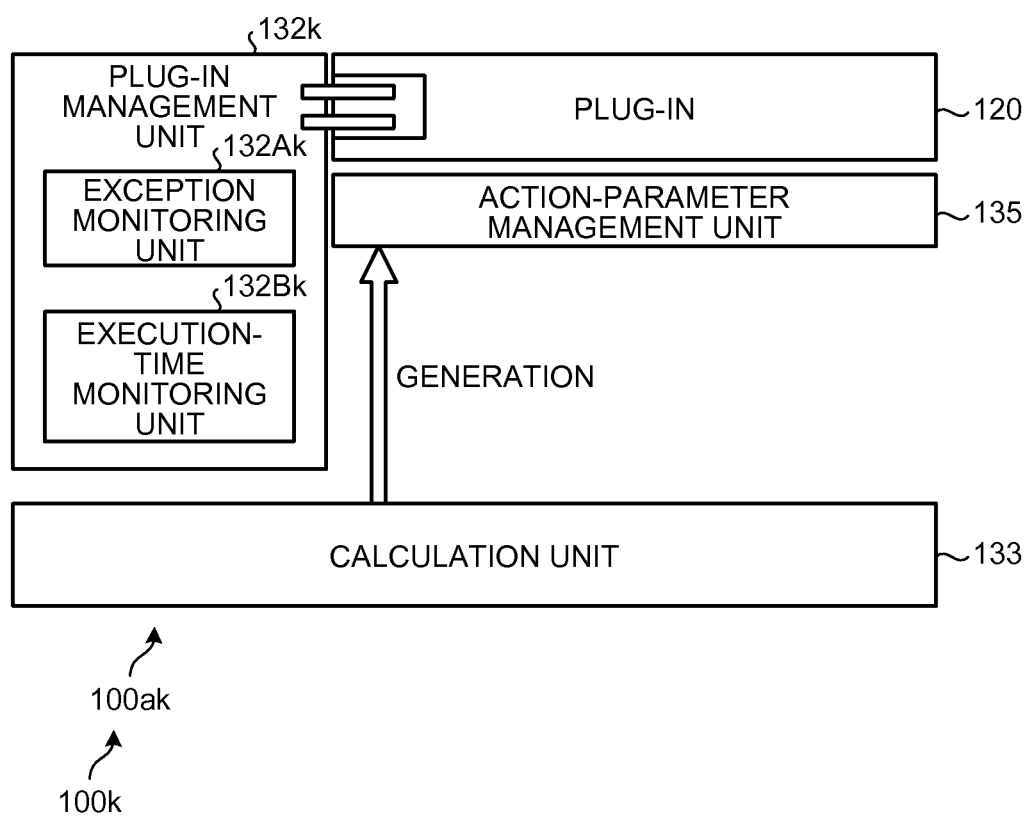
FIG. 18 is a diagram illustrating a functional configuration of a monitoring control device according to a third embodiment.

FIG. 18 illustrates a functional configuration example of a monitoring control device 100*k* (a configuration example of a monitoring control system 100*ak*).

A plug-in management unit 132*k* includes an exception monitoring unit 132A*k* and an execution-time monitoring unit 132B*k*.

The exception monitoring unit 132A*k* monitors whether the plug-in 120 causes exception handling. The exception monitoring unit 132Ak monitors an operation of the action 120a, and catches exception handling predefined in the monitoring control device 100k. The exception monitoring unit 132Ak supplies a monitoring result to the plug-in management unit 132k. For example, when the exception monitoring unit 132Ak catches the predefined exception handling, it supplies the plug-in management unit 132k with a monitoring result indicating a catch of the predefined exception handling.

After the plug-in 120 is started, the execution-time monitoring unit 132Bk monitors whether the action 120a is finished within a designated time. That is, the execution-time monitoring unit 132Bk monitors whether the execution of the action 120a is incomplete even when a designated time has elapsed. The execution-time monitoring unit 132Bk supplies a monitoring result to the plug-in management unit 132k. For example, in a case where the execution of the action 120a is incomplete even when a designated time has elapsed, the execution-time monitoring unit 132Bk supplies the plug-in management unit 132k with a monitoring result indicating the incompletion.

According to the monitoring results from the exception monitoring unit 132Ak and the execution-time monitoring unit 132Bk, the plug-in management unit 132k determines whether an abnormality has occurred in the operation of the action 120a. For example, when at least one of a first condition and a second condition is established, the plug-in management unit 132k determines that no abnormality has occurred in the operation of the action 120a. When both the first condition and the second condition are not met, the plug-in management unit 132k determines that an abnormality has not occurred in an operation of the action 120a. The first condition is that the plug-in 120 has caused exception handling predefined in the monitoring control device 100k. The second condition is that the execution of the action 120a is not completed even when a designated time has elapsed.

In a case in which an abnormality has occurred in an operation of the action 120a, the plug-in management unit 132k immediately stops executing the action 120a, and executes user-defined abnormality handling that is assigned in advance. After finishing the execution of the abnormality handling, the plug-in management unit 132k cancels the value written in the action parameter 135a.

In the exception monitoring unit 132Ak and the execution-time monitoring unit 132Bk, it is apparent that exception monitoring can be performed using a signal as described previously. However, exception monitoring can also be performed by a method to generate random numbers in the plug-in 120 at the time of starting, and update the random numbers at a time designated during the execution.

Figure 19:
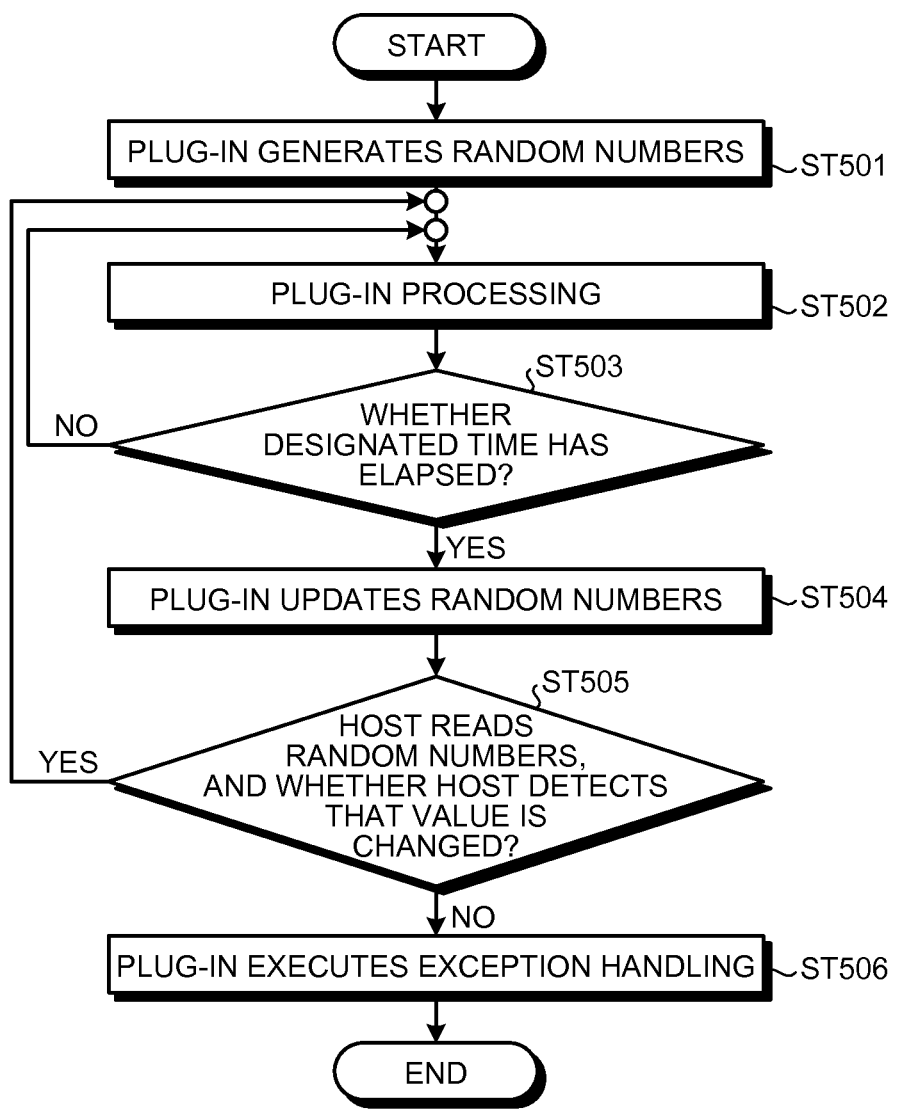
FIG. 19 is a flowchart illustrating a flow of exception monitoring according to the third embodiment.

FIG. 19 is a flowchart illustrating this procedure. When the plug-in 120 is started by executing the action 120a, this flow begins.

At Step ST501, the plug-in 120 generates random numbers. At Step ST502, the processing of the plug-in 120 is performed.

At Step ST503, whether a designated time has elapsed is determined. If a designated time has not yet elapsed (NO at Step ST503), the processing flow returns to Step ST502. If a designated time has elapsed (YES at Step S503), the processing flow advances to Step ST504.

At Step ST504, the plug-in 120 updates the random numbers.

At Step ST505, the host 130 (see FIG. 2) reads the random numbers updated by the plug-in 120, and determines whether the value is updated. If the value is updated (YES at Step ST505), the processing flow returns to Step ST502. If the value is not updated (NO at Step ST505), the processing flow advances to Step ST506.

At Step ST506, the plug-in 120 executes exception handling.

As described above, the host 130 monitors random numbers of the plug-in 120 at a designated frequency. For example, the host 130 stores therein the previous value of random numbers, and upon obtaining a present value of the random numbers, compares this present value with the previous value. When, according to a result of the comparison, the host 130 determines that the random numbers remain unchanged from the previous value, an abnormality is determined to have occurred in an operation of the action 120a. Therefore, the host 130 invokes an exception handler of the plug-in 120 (user-defined abnormality handling).

The exception handler of the plug-in 120 is registered at the time of registering the plug-in 120, for example. At this time, it is also possible that a handle is not registered, but a common function is defined. For example, a function named "ExceptionHandler( )" can also be defined to the action in FIG. 7.

As described above, in the third embodiment, in the monitoring control device 100k, the exception monitoring unit 132Ak monitors an operation of the action 120a, and catches exception handling predefined in the monitoring control device 100k. The execution-time monitoring unit 132Bk monitors whether the execution of the action 120a is incomplete even when a designated time has elapsed. According to the monitoring results from the exception monitoring unit 132Ak and the execution-time monitoring unit 132Bk, the plug-in management unit 132k determines whether an abnormality has occurred in an operation of the action 120a. In a case in which an abnormality has occurred in an operation of the action 120a, the plug-in management unit 132k immediately stops executing the action 120a, and executes user-defined abnormality handling that is assigned in advance. After finishing the execution of the abnormality handling, the plug-in management unit 132k cancels the value written into the action parameter 135a. Due to this operation, the plug-in management unit 132k can monitor abnormality in the operation of a plug-in, and can suppress the execution of the plug-in which damages a monitoring control system. Therefore, the plug-in management unit 132k can improve reliability of the monitoring control system. That is, because the plug-in management unit 132k can monitor an action execution state such as exception handling or timeout, a more reliable system can be constructed as compared to the first embodiment.

INDUSTRIAL APPLICABILITY

As described above, the monitoring control device according to the present invention is useful for a monitoring control of a device.

REFERENCE SIGNS LIST 20 external system, 30 device, 40 setting personal computer, 100, 100j, 100k monitoring control device.

The invention claimed is:
1. A monitoring control device to monitor and control an external device according to a host, the monitoring control device comprising one or more hardware processors comprising:

a plug-in management unit to identify a target action to be executed among a plurality of actions included in a plug-in that is physically attached to the host;

an action-parameter management unit to generate a plurality of arrays that is dedicated to storing a plurality of action parameters corresponding to the plurality of actions included in the plug-in, to allocate memory addresses of the generated plurality of arrays to a same process space that is shared between the host and the plug-in, and to access an array corresponding to the target action identified by the plug-in management unit among the generated plurality of arrays to operate an action parameter corresponding to the target action; and a calculator to obtain a job file describing a procedure for cooperating with an external system and designating the plug-in to be executed in the monitoring control device, wherein, before execution of the target action, the calculator obtains variable attributes from the plurality of action parameters related to actions included in the job file, and obtains variable present values by using the obtained attributes, and wherein, after completion of execution of the actions in the job file, the calculator removes calculation results from the plurality of action parameters to update the variable present values according to the obtained attributes, and wherein each of the plurality of action parameters has a pair of a variable identifier and a variable present value as an element.

2. The monitoring control device according to claim 1, further comprising:

a memory; and a communication interface to obtain a measurement value from the external device to store the measurement value in the memory, to output a calculation value held in the memory to the external device, and to communicate the measurement value and the calculation value that are held in the memory with an external system;

wherein the calculator refers to a value in the memory to obtain the calculation results according to the job file by using the plug-in and to store the calculation results in the memory.

3. The monitoring control device according to claim 1, wherein the plug-in management unit calls an identifier that designates the target action to be executed and is indicated in a program of the plug-in, in order to control execution of the target action and extend a function of the host, and the action-parameter management unit assigns an element index to the accessed array, in order to read or write a value included in the corresponding action parameter.

4. The monitoring control device according to claim 1, further comprising:

a memory; and a communication interface to enable communication between the memory and an external system, and between the one or more hardware processors and the external system, wherein the one or more hardware processors further comprises a variable management unit to perform calculation by obtaining and operating a value in the memory and data in the external system to transmit a calculation result to the external system or write the calculation result in the memory, to define a value in the memory and data in the external system, each of which is a processing target in the control program, as a variable, and to assign an identifier to a set of attributes for identifying the defined variable to manage the variable.

5. A monitoring control device to monitor and control an external device according to a host, the monitoring control device comprising one or more hardware processors comprising:

a plug-in management unit to identify a target action to be executed among a plurality of actions included in a plug-in attached to the host; and an action-parameter management unit to generate a plurality of arrays that is dedicated to storing a plurality of action parameters corresponding to the plurality of actions included in the plug-in, to allocate memory address of the generated plurality of arrays to a same process space that is shared between the host and the plug-in, and to access an array corresponding to the target action identified by the plug-in management unit among the generated plurality of arrays to operate an action parameters corresponding to the target action, wherein the plug-in management unit includes an exception monitor to monitor an operation of the target action, and to catch exception handling predefined in the monitoring control device, and an execution-time monitor to monitor whether execution of the target action is incomplete even when a designated time has elapsed, and when, according to monitoring results from the exception monitor and the execution-time monitor, the plug-in management unit determines that an abnormality has occurred in an operation of the target action, the plug-in management unit immediately stops executing the target action, executes user-defined abnormality handling that is assigned in advance, and cancels a value written to the action parameter after finishing execution of the abnormality handling.

* * * * *